US010841637B2

United States Patent
Reitmeier et al.

(10) Patent No.: US 10,841,637 B2
(45) Date of Patent: Nov. 17, 2020

(54) TIME-ADAPTED CONTENT DELIVERY SYSTEM AND METHOD

(71) Applicant: NBCUniversal Media, LLC, New York, NY (US)

(72) Inventors: Glenn A. Reitmeier, Yardley, PA (US); Daniel Berkowitz, New York, NY (US); Christopher J. Falkner, Hoboken, NJ (US); Sheau Bao Ng, Wayland, MA (US)

(73) Assignee: NBCUniversal Media, LLC, New York, NY (US)

( * ) Notice: Subject to any disclaimer, the term of this patent is extended or adjusted under 35 U.S.C. 154(b) by 74 days.

(21) Appl. No.: 16/376,421

(22) Filed: Apr. 5, 2019

(65) Prior Publication Data

US 2019/0268646 A1     Aug. 29, 2019

Related U.S. Application Data

(63) Continuation of application No. 12/965,546, filed on Dec. 10, 2010, now abandoned.

(60) Provisional application No. 61/408,400, filed on Oct. 29, 2010.

(51) Int. Cl.

| | |
|---|---|
| *H04N 21/4147* | (2011.01) |
| *H04N 21/234* | (2011.01) |
| *H04N 21/44* | (2011.01) |
| *H04N 21/658* | (2011.01) |
| *H04N 21/81* | (2011.01) |
| *H04N 21/8352* | (2011.01) |
| *H04N 5/76* | (2006.01) |

(Continued)

(52) U.S. Cl.
CPC .......... *H04N 21/4147* (2013.01); *H04N 5/76* (2013.01); *H04N 5/765* (2013.01); *H04N 21/23424* (2013.01); *H04N 21/44016* (2013.01); *H04N 21/6581* (2013.01); *H04N 21/812* (2013.01); *H04N 21/8352* (2013.01); *H04N 5/91* (2013.01)

(58) Field of Classification Search
CPC ...... H04N 21/4147; H04N 5/76; H04N 5/765; H04N 21/23424; H04N 21/44016; H04N 21/6581; H04N 21/812; H04N 21/8352; H04N 5/91
See application file for complete search history.

(56) References Cited

U.S. PATENT DOCUMENTS

| | | |
|---|---|---|
| 6,029,045 A | 2/2000 | Picco et al. |
| 2002/0092017 A1 | 7/2002 | Klosterman et al. |

(Continued)

*Primary Examiner* — Hai V Tran
(74) *Attorney, Agent, or Firm* — Fletcher Yoder, P.C.

(57) ABSTRACT

A system for coordinated playback of time-shifted content with time-adapted complimentary content is provided. The time-shifted content may be played back from storage media, both local and remote. Time-shifting may occur by independent playback such as from optical discs and other memory devices, as well as from user manipulation of features in a playback system based upon real-time or near real-time content distribution. The content is identified, along with timing information identifying where in the content the playback is occurring. Time-adapted complimentary content may then be selected and transmitted to the playback system. Such time-adapted content may include advertisement, product and service offerings, complimentary information, audio and/or video content, and so forth.

18 Claims, 2 Drawing Sheets

(51) Int. Cl.
*H04N 5/765* (2006.01)
*H04N 5/91* (2006.01)

(56) References Cited

U.S. PATENT DOCUMENTS

| | | | |
|---|---|---|---|
| 2002/0144262 A1* | 10/2002 | Plotnick | H04N 21/252 |
| | | | 725/32 |
| 2003/0002854 A1 | 1/2003 | Belknap et al. | |
| 2003/0084442 A1 | 5/2003 | Kellner et al. | |
| 2003/0154128 A1 | 8/2003 | Liga et al. | |
| 2004/0003397 A1 | 1/2004 | Boston et al. | |
| 2005/0060742 A1 | 3/2005 | Riedl et al. | |
| 2005/0188297 A1 | 8/2005 | Knight et al. | |
| 2006/0168617 A1 | 7/2006 | Maetz et al. | |
| 2009/0158318 A1 | 6/2009 | Levy | |
| 2009/0222849 A1 | 9/2009 | Peters | |
| 2010/0175082 A1 | 7/2010 | Blumenschein et al. | |
| 2010/0228591 A1* | 9/2010 | Therani | G06Q 30/0256 |
| | | | 705/14.54 |
| 2010/0251278 A1 | 9/2010 | Agarwal et al. | |
| 2010/0312608 A1 | 12/2010 | Shan et al. | |
| 2012/0109755 A1* | 5/2012 | Birch | G06Q 30/0269 |
| | | | 705/14.66 |

* cited by examiner

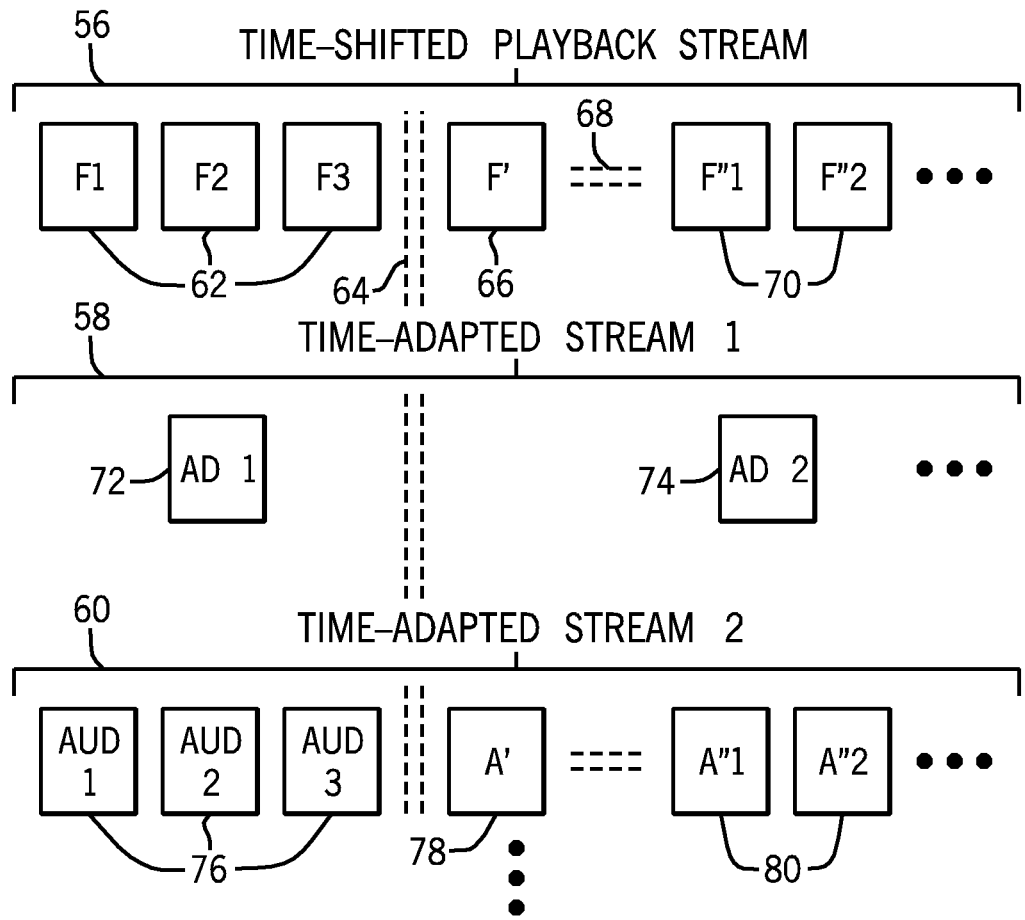
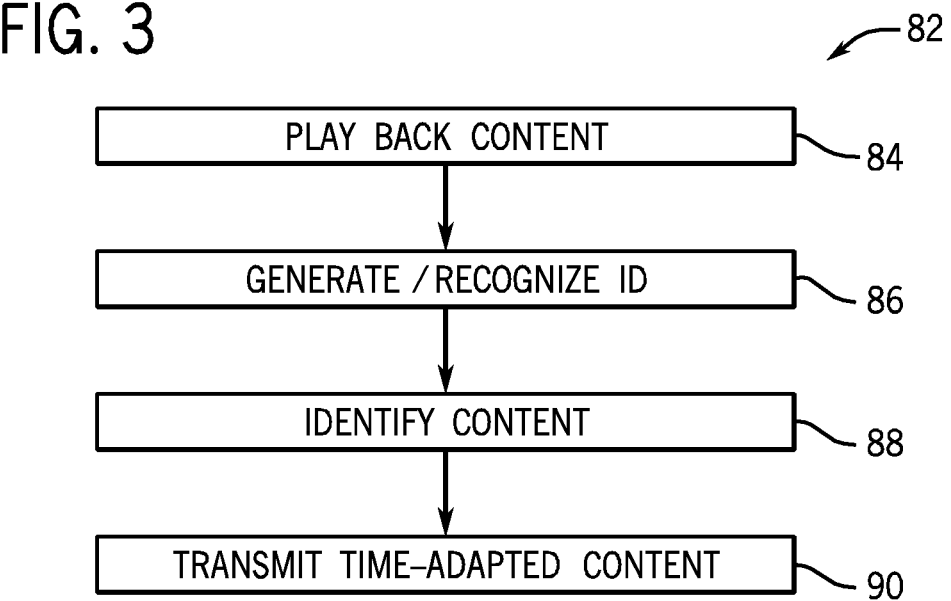

TIME-ADAPTED CONTENT DELIVERY SYSTEM AND METHOD

CROSS-REFERENCE TO RELATED APPLICATIONS

This application is a continuation of U.S. patent application Ser. No. 12/965,546, filed Dec. 10, 2010, and entitled, "TIME-ADAPTED CONTENT DELIVERY SYSTEM AND METHOD," which claims priority to U.S. Provisional Patent Application No. 61/408,400, entitled "Time-Adapted Content Delivery System and Method", filed Oct. 29, 2010, which are herein incorporated by reference in their entirety.

BACKGROUND OF THE INVENTION

The present application relates generally to the field of digital content distribution, and more particularly to a technique for distributing time-adapted content for combination with time-shifted content played back by a user.

A wide range of systems have been developed and are presently in use for distributing and playing back digital content. Historically, such content was provided by broadcast channels and played back in real-time by viewers equipped with an appropriate receiver, typically a television or radio. Increasingly, however, competing media allow for both real-time enjoyment of linear transmissions and time-shifted playback. Real-time multi-media content is most often viewed by transmission over the airwaves (traditional broadcast), or by cable transmissions, satellite transmissions, and, increasingly, digital Internet-based media. In many cases, however, audiences enjoy content by purchasing physical supports such as optical discs on which the content is temporarily or permanently stored. Similarly, time-shifting is provided by allowing for recording, at a receiver side or at a provider side, of specific programming at the request of users. Still further, time-shifting occurs when a user can execute such functions as pause, rewind, and fast forward of currently disseminated programming, such as with capable set-top boxes, receivers, cable boxes and so forth.

Various techniques have developed in parallel, with the ability to selectively convey complementary content that is intended to enhance the audience experience. Such content may include, for example, information regarding current programming, targeted advertisements regarding current programming, informational inserts regarding later programmed offerings, and so forth. These complementary components are often transmitted in a data stream with the underlying content, and are often designed to complement or supplement the content as it is played back in real-time. Similarly, efforts have been made to provide for advertising and other information to complement content that is sold for later playback, such as on optical discs.

However, little or no advancement has been made for providing complementary content for time-shifted viewing. Technical difficulties arise in such situations insomuch as the degree of time-shifting is often completely unknown and unknowable, the user being virtually in complete control of the timing of playback. There is a need, therefore, for improved techniques that may allow for the provision of complementary content even when underlying content is played back in a time-shifted manner.

BRIEF DESCRIPTION OF THE INVENTION

The present invention provides a novel technique designed to respond to such needs. The technique may be employed with any range of content disseminated by broadcast media, satellite, cable, the Internet, or any other mechanism. The technique may also be used with stored content that is subsequently played back by a viewing audience. The invention allows for the supply of time-adapted complimentary content that is coordinated with the time-shifted playback. The complimentary content may comprise advertisements, supplemental information, product offerings, informational data, audio and/or video accompaniment, and so forth, to mention only a few.

Accordingly, in one aspect of the invention, a system for delivery of digital content comprises a content identification component configured to identify digital content played back in a time-shifted manner and a content delivery component configured to transmit time-adapted content based upon the identified time-shifted digital content.

The invention also provides a method for delivery of digital content that includes determining an identity of digital content played back in a time-shifted manner, and transmitting time-adapted content based upon the identified time-shifted digital content.

In one embodiment of the method, an identity of digital content played back in a time-shifted manner is determined, time-adapted content is delivered based upon the identified time-shifted digital content during time-shifted playback of the digital content for play back with the time-shifted digital content.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a diagrammatical representation of coordinated transmission of time-adapted streams with time-shifted playback; and FIG. 3 is a flow chart illustrating exemplary logic in the coordination of time-adapted content with time-shifted playback.

DETAILED DESCRIPTION OF THE INVENTION

Figure 1:
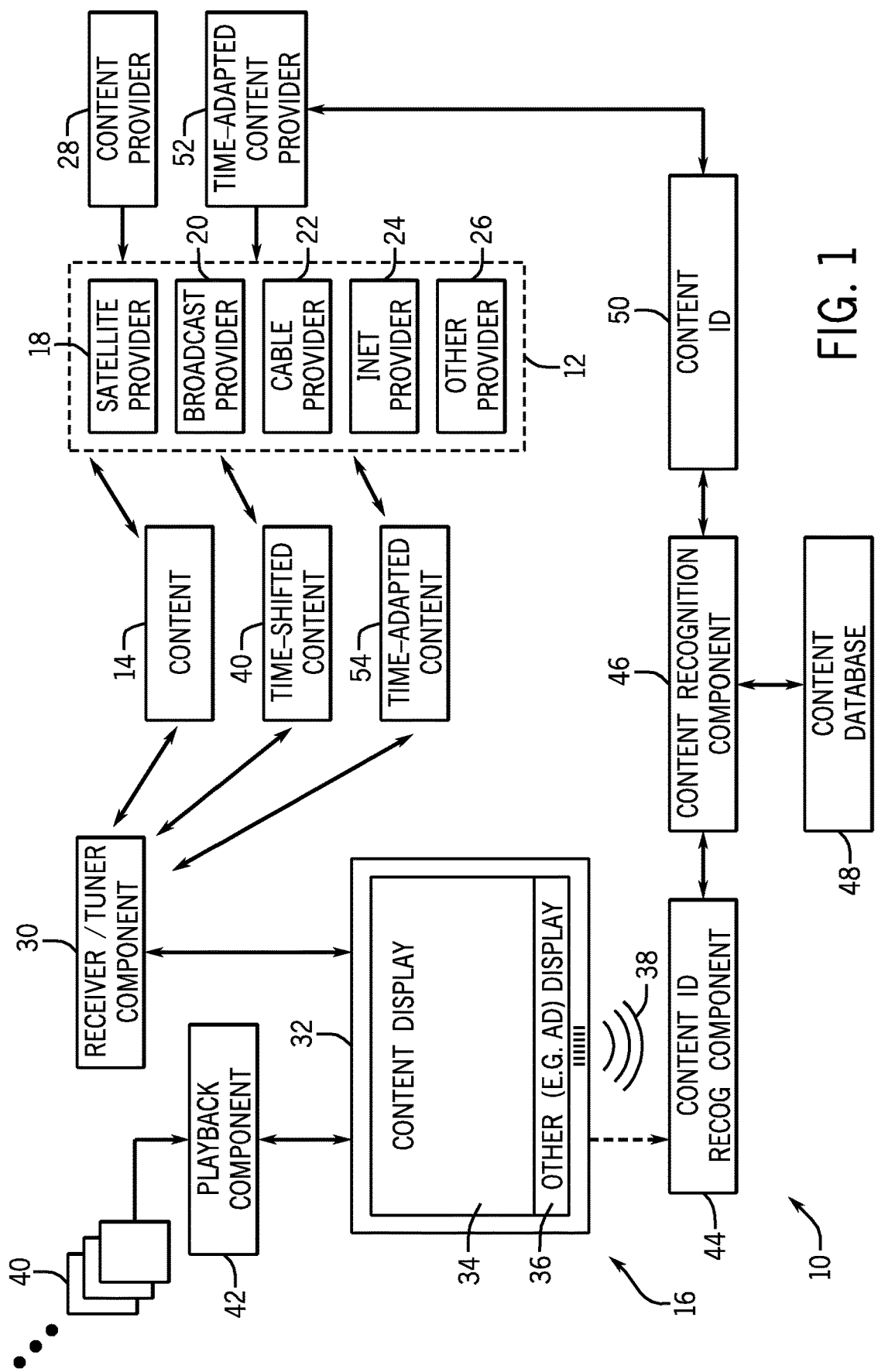
FIG. 1 is a diagrammatical representation of a content distribution and processing system in accordance with certain aspects of the present invention.

Turning now to the drawings, and referring first to FIG. 1, a digital content distribution and processing system 10 is illustrated that allows providers 12 to transmit content 14 to audience playback systems 16. The providers 12 may include a range of providers that transmit the content in accordance with existing technologies. In the illustrated embodiment these include satellite providers 18, broadcast providers 20, cable providers 22, Internet providers 24, and other providers 26. The latter group may include providers that offer digital content via such media as cellular telephone networks, but also conventional distribution channels such as movie rental houses, retail sales establishments (e.g., providing content on optical discs and other supports), and so forth. The providers 12 may transmit content from their own proprietary libraries, but most often will transmit or distribute content from one or more content providers 28. Such content providers may be partially or fully integrated with one or more of the providers 12, and may themselves be production houses, content repositories, television or movie studios, multi-media content producers, and so forth. In many cases, the content 14 may include television and movie programming, but may also include both video, audio, multi-media and other programming that may be transmitted on a regular schedule or upon user command (e.g., for Internet website delivery).

The playback system 16 may include a range of conventional equipment but is particularly adapted for use in the present technique as described below. In the illustrated embodiment, the playback system 16 includes a receiver/tuner component 30 that may be similar to conventional receivers, set-top boxes, cable boxes, and the like. The receiver/tuner component 30 will typically be coupled to a monitor 32 capable of reconstructing and displaying video based upon the received signals. In certain systems, the receiver/tuner component may be integrated into the monitor component, and/or may be or include circuitry for receiving and decoding satellite signals, broadcast signals, cable signals, Internet transmissions, or any other content encoding. In the illustrated embodiment, a content display section 34 is illustrated along with a section 36 for the display of other content. As will be described in greater detail below, such other content may include advertisements, information, complimentary product and service offerings, and so forth. However, such content may also include general video content, audio content, a combination of audio and video content, and so forth. The other content played back, as indicated by reference numeral 36 should, therefore, not be considered to be limited to advertisements or any other specific content that is displayed in a portion or section of the monitor, but more generally any content that bears some desired relation to the primary content being played. As indicated by reference numeral 38, the playback system 16 will also typically include one or more speakers for reproducing an audio portion of the desired content. As described more fully below, this audio portion may, also, comprise the complementary content that is to be distributed for playback.

It should be noted that the other content added to the basic content may have a temporal element rather than or in addition to a spatial aspect. That is, the other content may be played back at a desired time in the basic content, may be spliced into the basic content, may be superimposed over or replace a portion of the basic content, may correspond to one or more times for insertion into the basic content, and so forth. It may be noted that, in a presently contemplated embodiment, such superimposed or replaced portions of the content may be inserted in accordance with screen coordinates, which may be stored, for example, in a database for the content, as described below. Moreover, any time synchronization performed with respect to the basic content may include times for appearance (addition/replacement) and disappearance (removal/return to basic content).

In addition to playing back content received in real-time or near real-time, the playback system 16 is adapted for time-shifted playback of content. In the illustrated embodiment, for example, two types of time-shifted content may be routinely played back, including content that is stored in the system, and content that is transmitted from a provider, both indicated by reference numeral 40 in FIG. 1. The stored content may take any suitable form, such as content stored on optical discs and other temporary or permanent supports, computer memory, and so forth. Transmitted time-shifted content may include stored content that is kept by a provider at the request of the user, as well as content that is time-shifted by manipulation of the playback system (e.g., execution of pause, rewind, and fast forward commands on a remote control device). It should be noted that the present technique is not limited to the location or particular system component that performs the time-shifting. Thus, certain time-shifting operations may be performed on the playback system 16, while others are performed by the service provider or by a third party. Where the playback system 16 locally stores and plays back content, a special playback component 42 is generally provided, such as a optical disc player, computer memory, or another system-level device.

It should be noted that the term "time-shifted" in the present context may be contrasted with "linear" playback in which content is sent by a provider to a collective audience, typically based on a set schedule, and simply played back at the same time, or nearly the same time by the collective audience with little or no control over the timing by the audience members. While some time-shifted content may be transmitted, or will have been transmitted at some earlier time (in come cases as part of linear programming), the present context does not require that such time-shifted content ever was transmitted over airwaves, cable, satellite transmission, network or otherwise by a provider. For example, some such content may be stored on disc or other memory devices. In this sense, the time-shifted content may be thought of as "on demand" content, the playback of which will often be at the control of an individualized audience.

The system allows for the provision of complementary content that may enhance the audience experience in much the same way as contemporaneously transmitted complimentary content may do for real-time viewing. To permit the provision of such content, the system allows for identification of the time-shifted content at the time of playback such that the complimentary content can be coordinated with the playback. In the illustrated embodiment, a content identification recognition component 44 is provided that may be incorporated into one or more components of the playback system 16 and/or that may be provided by a third party. In particular, several techniques may be contemplated for recognizing what content is being played back, along with the section or chapter of the content, timing of the content, frames of the content, and so forth. Such techniques may include, for example, reference to metadata that is stored or accessible with or from the content, typically descriptive of the content title, version, section or temporal point in the playback, and so forth. Such metadata may also include information relating to the date of original transmission, the time of original transmission, and so forth. In other techniques, the content may be identified from analysis of the digital content data, such as for digital watermarks. Still further, the content may be analyzed for real-time or near real-time generation of digital signatures or fingerprints that are descriptive of content, individual frames or sections in the content, and so forth.

Based upon this content identification recognition component, a content recognition component 46 may make reference to a database 48 that allows for identification of the specific content, and, if desired, a temporal position of the playback in the content. Here again, the content recognition component 46 may be included in the playback system 16 but may also be defined by one or more programmed computers or other devices in one or more of the providers 12, content provider 28, or any third party. The content database 48 may cross-reference various information available for identifying the content with known transmissions, libraries, collections of content, and so forth. Based upon comparisons made by the content recognition component 46, then, a content identification is made as indicated by reference numeral 50. It should be noted that the content database may be, at least partially, located on the playback system, or on any desired component. For example, the data used for identification may be proprietary to and/or in the same location as the time-adapted content provider. In other cases, the data may be maintained remotely by an unrelated third party.

The content identification 50 is used to determine time-adapted content that may be provided by a time-adapted content provider 52. Such content may include any desired complimentary content both visual, audible, or a combination. The time-adapted content provider 52, moreover, may be the same as content provider 28, the same as one or more of the providers 12, or may be a third party. For example, the time-adapted content provider 52 may offer advertisements, product offerings, service offerings, transactional offers, and so forth that bear some relevance to the content being played back in a time-shifted manner. However, the time-adapted content provider 52 is not limited to product or service offerings. Rather, the time-adapted content provider 52 may provide audio content that is coordinated with the time-shifted content, such as for musical, foreign language, and other accompaniment. Similarly, closed captioned content may be provided that is coordinated with the underlying time-shifted content. Where product and service offerings are provided, these may be adapted based upon the time and date of the playback, as opposed to the original time and date of the transmission of the underlying content, or any date of stored content. This technique may allow for specific targeting of audiences for such offerings based upon the date of playback, the time of playback, renew product and service offerings that have been developed since the content was originally distributed, new or changed premiums or discounts for such offerings, and so forth. Based upon the contribution from the time-adapted content provider 52, then, one or more of the providers 12 will distribute time-adapted content 54 for combination with the time-shifted playback on the playback system 16.

It should be noted, however, that the time-adapted content need not be transmitted from the provider in real-time (sometimes referred to as "linearly") as the main content is being played back. A device that is part of or local to the playback system (e.g. set-top box) might contain a library of additional content (refreshed from time-to-time by the time-adapted content provider), and it may be the local device that selects the additional content to be displayed to the user based on the content identification. The local device may keep track of which additional content was actually displayed and transmit reports back to the time-adapted content provider.

It should also be noted that in many cases the additional content will complement in some way, or be relevant to the main content being played back. However, such is not necessarily the case. For example, such additional content may be customized to an individual audience profile and/or preferences. In that case metadata, fingerprints, etc. may simply be used to determine the appropriate temporal or spatial locations for inserting the audience-customized content, advertisements, offers, and so forth.

Still further, it is presently contemplated that any one of several scenarios may be envisaged for the "provision" of the time-shifted and the time-adapted content. For example, both the time-shifted content and the time-adapted content may be transmitted by one or more providers to the playback system. Alternatively, one of the time-shifted content and the time-adapted content may be transmitted by a provider, and the other may be stored and accessed by the playback system or a component accessible by it. Still further, in some cases both the time-shifted content and the time-adapted content may be stored and accessed by the playback system or a component accessible by it.

FIG. 2 illustrates exemplary data streams that may be determined by the system of FIG. 1 for coordination of time-shifted playback with time-adapted content. In the illustration of FIG. 2, a time-shifted playback stream 56 comprises data which is converted by the playback system to video, audio, or both. The time-shifted playback stream has, coordinated with it, time-adapted streams 58 and 60. In practice, a single or a multiple of such time-adapted streams may be provided. For the purposes of explanation, the time-shifted playback stream 56 may be considered to include multiple successive frames 62 of content. In practice, these may be defined by progressive scanning of lines on a video monitor, and in the case of audio content these may consist of continuous streams of data defining audio playback. Several different types of events may occur during the time-shifted playback, such as breaks or pauses as indicated by reference numeral 64, continuing the stream in subsequent frames 66. Similarly, fast forward commands 68 may effectively skip certain content and move to subsequent frames 70. Similar time-shifting events may occur for rewind, still frame viewing, and so forth.

As noted above, the system described with respect to FIG. 1 allows for identification of the content being played back in a time-shifted manner and, where desired, the specific frame or time location within the content. A time-adapted content stream 58 may thus be defined by the time-adapted content provider and supplied for playback with the time-shifted content. In the embodiment illustrated in FIG. 2, for example, an advertising stream is coordinated with the time-shifted playback stream such that a first ad 72 is placed in a first section of the playback while a second ad 74 is placed in a second section. The ads may occur in any suitable conventional manner, such as being displayed in lieu of the underlying principal content, superimposed on the content, and so forth. Again, as noted above, the particular selection of the time-adapted advertisements may take into account the time of the playback, the date of the playback, the profile of the user, and so forth. The third data stream illustrated in FIG. 2 is a time-adapted audio stream. Such audio streams may include music, sounds of various types, but may particularly include alternate languages that may be selected by the user, and so forth. Where a frame-by-frame matching of the audio content is desired, sections 76, 78 and 80 may be transmitted that correspond to frames 62, 66 and 70 of the principal time-shifted playback stream 56, respectively.

It should be noted that the time-adapted streams may be sourced from any suitable media. This media need not be the same as that used for the time-shifted playback. Indeed, in cases where the contents of the media containing the time-shifted playback content is fixed, (such as in the case of optical discs or other memory supports), the time-adapted streams will be sourced from different media. Where desired, then, time-shifted playback content may be transmitted, for example, from a provider memory (separate from the playback system) with the time-adapted data being integrated into or combined with the time-shifted playback content. In other embodiments, the time-shifted playback may be sent by one provider or by first medium, with the time-adapted streams being sent by a different provider or by a different medium.

FIG. 3 illustrates exemplary logic for carrying out such time-adapted coordinated content delivery. The exemplary logic, indicated by reference numeral 82 in FIG. 3, begins with time-shifted playback of content as indicated by reference numeral 84. Again, this may be done from various storage devices, but also by systems that permit recording and/or time shifting of current programming. At step 86, then, information indicative of the content and the timing of playback of the content is generated or recognized. Based upon such identifying information, the content and the temporal location in the content is identified as indicated at step 88. Time-adapted complimentary content is then accessed and transmitted as indicated at step 90.

It should be noted that, while the present discussion refers to "transmission" of time-adapted content, that term should be interpreted to mean that such content is provided to the playback system or accessed by the playback system for playback with the time-shifted content. That is, the time-adapted content may be sent by a provider during playback of the time-shifted content. In other cases, the time-adapted content may be stored on some component of the playback system, or on a component accessible (typically via a network) by the playback system, and accessed based upon the identification made of the time-shifted content.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A playback system for presenting digital content, comprising:
   a receiver configured to receive a transmission of the digital content from a content provider, wherein the digital content comprises a digital watermark; and
   a processor configured to play back the digital content at a normal speed after receiving the transmission of the digital content and to determine an identity and a play back position of the digital content based on the digital watermark,
   wherein the receiver is further configured to receive additional digital content from a time-adapted content provider based, at least in part, on the identity of the digital content,
   wherein the processor is further configured to present the additional digital content to replace a portion of the digital content during the play back of the digital content, and wherein the additional digital content includes:
   time-adapted content; and
   a plurality of temporal elements defining when, during the play back of the digital content, the playback system begins presenting and stops presenting the time-adapted content.

2. The playback system of claim 1, wherein the plurality of temporal elements comprises:
   a first temporal element defining a first time in the play back of the digital content when the playback system begins presenting the time-adapted content; and
   a second temporal element defining a second time in the play back of the digital content when the playback system stops presenting the time-adapted content.

3. The playback system of claim 1, wherein the plurality of temporal elements comprises:
   a first temporal element defining a first time in the play back of the digital content when the playback system begins presenting the time-adapted content; and
   a second temporal element defining a duration extending from the first time after which the playback system stops presenting the time-adapted content.

4. The playback system of claim 1, wherein the receiver is configured to receive the additional content from the time-adapted content provider during the play back of the digital content.

5. The playback system of claim 1, wherein the presentation of the time-adapted content is synchronized with the play back of the digital content.

6. The playback system of claim 1, wherein the content provider and the time-adapted content provider are the same provider.

7. The playback system of claim 1, wherein the digital content comprises metadata, and wherein the processor is configured to determine the identity and a play back position of the digital content based on the digital watermark and the metadata of the digital content.

8. The playback system of claim 1, wherein the processor is configured to:
   generate a digital fingerprint from the digital content; and
   determine the identity of the digital content based on the digital watermark and the digital fingerprint.

9. The playback system of claim 1, wherein the digital content is stored on the playback system, and wherein the additional content is stored on a system remote from the playback system.

10. A method of operating a playback system, comprising:
    receiving and storing digital content from a content provider; and
    while playing back the digital content at a normal speed in a time-shifted manner:
    determining identifying data of the digital content, wherein determining the identifying data comprises determining a play back position of the digital content by analyzing the digital content to identify digital watermarks;
    providing the identifying data of the digital content to an additional content provider;
    receiving additional digital content from the additional content provider, wherein the additional digital content includes:
    time-adapted content; and
    a plurality of temporal elements defining moments, during the playing back of the digital content that the playback system begins presenting and stops presenting the time-adapted content; and
    replacing a portion of the digital content with the time-adapted content based on the plurality of temporal elements.

11. The method of claim 10, wherein replacing a portion of the digital content with the time-adapted content, comprises:
    presenting the time-adapted content at a first time during the playing back of the digital content, wherein the first time is indicated by a first temporal element of the plurality of temporal elements; and
    ceasing presentation of the time-adapted content at a second time during the playing back of the digital content, wherein the second time is indicated by a second temporal element of the plurality of temporal elements.

12. The method of claim 10, wherein replacing the portion of the digital content with the time-adapted content, comprises:
  presenting the time-adapted content at a first time during the playing back of the digital content, wherein the first time is indicated by a first temporal element of the plurality of temporal elements; and
  ceasing presentation of the time-adapted content after a length of time has passed since the first time during the playing back of the digital content, wherein the length of time is indicated by a second temporal element of the plurality of temporal elements.

13. The method of claim 10, wherein replacing the portion of the digital content with the time-adapted content comprises presenting the time-adapted content while playing back the digital content, wherein the time-adapted content replaces the portion of the digital content on a display of the playback system.

14. The method of claim 10, wherein determining the identifying data of the digital content comprises determining a time and date of the playing back of the digital content.

15. The method of claim 10, wherein determining the identifying data of the digital content comprises analyzing the digital content to identify metadata of the digital content, wherein the metadata comprises a portion of the identifying data of the digital content.

16. A non-transitory, computer-readable medium storing instructions executable by a processor of a playback system, the instructions comprising instructions to:
  store digital content received from a content provider;
  play back the digital content at a normal speed in a time-shifted manner, comprising instructions to:
    determine an identity and a play back position of the digital content by analyzing the digital content to identify digital watermarks;
    provide the identity and the play back position of the digital content to an additional content provider;
    receive additional digital content from the additional content provider, wherein the additional digital content includes:
      time-adapted content; and
      a plurality of temporal elements defining when the playback system begins presenting and stops presenting the time-adapted content; and
    replace a portion of the digital content with the time-adapted content based on the plurality of temporal elements.

17. The medium of claim 16, wherein the instructions to replace the portion of the digital content with the time-adapted content comprise instructions to:
  present the time-adapted content on a display of the playback system at a first time during the play back of the digital content, wherein the first time is indicated by a first temporal element of the plurality of temporal elements; and
  removing the time-adapted content from the display of the playback system at a second time during the play back of the digital content, wherein the second time is indicated by a second temporal element of the plurality of temporal elements.

18. The medium of claim 16, wherein the instructions to replace the portion of the digital content with the time-adapted content comprise instructions to:
  present the time-adapted content on a display of the playback system at a first time during the play back of the digital content, wherein the first time is indicated by a first temporal element of the plurality of temporal elements; and
  remove the time-adapted content from the display of the playback system after a length of time has passed since the first time during the play back of the digital content, wherein the length of time is indicated by a second temporal element of the plurality of temporal elements.

* * * * *